Figure 1:
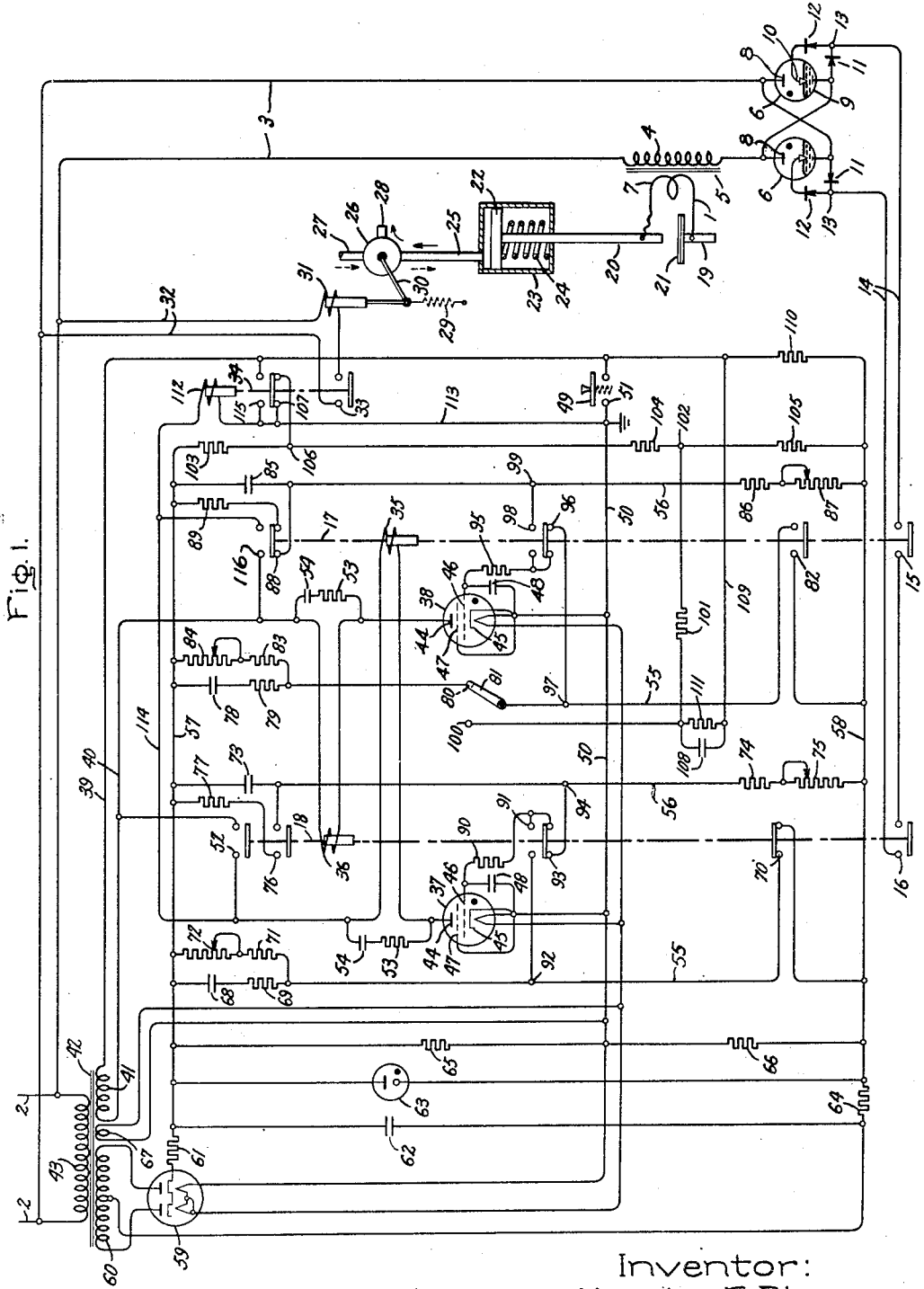

Inventor:
Maurice E. Bivens,
by (signature)
His Attorney.

May 8, 1951 M. E. BIVENS 2,552,137
TIME-DELAY RELAY SYSTEM
Filed Sept. 8, 1948 2 Sheets-Sheet 2

Inventor:
Maurice E. Bivens,
by  His Attorney.

Patented May 8, 1951

2,552,137

UNITED STATES PATENT OFFICE 2,552,137

TIME-DELAY RELAY SYSTEM

Maurice E. Bivens, Schenectady, N. Y., assignor to General Electric Company, a corporation of New York Application September 8, 1948, Serial No. 48,256

25 Claims. (Cl. 175—320)

My invention relates to timing apparatus and more particularly to apparatus embodying electric circuits in which electric discharge devices are employed for obtaining desired timing operations.

In industrial control, it is frequently desirable to provide apparatus for controlling the sequence and timing of certain operations. For example, in resistance welding, certain operations must follow one another after predetermined adjustable time periods and a sequence control for such purpose will involve at least four timing intervals which may be identified as "squeeze," "weld," "hold," and "off." The squeeze time allows for the operation of means employed for closing the welding electrodes on the work with the desired pressure before the welding current is applied thereto through the electrodes to make a weld. The weld time determines the period during which welding current flows to make the weld. The hold time determines the time that the electrodes remain on the work with full pressure after welding current ceases flowing and before the means for pressing the electrodes on the work is operated to release the work. The off time determines the time interval before the means for pressing the electrodes into engagement with the work is again operated when performing repeat operations. For certain types of resistance welding, such as in pulsation welding, the flow of welding current is periodically interrupted during the welding time and the period or periods during which current flows is then identified as the "heat" time and the period or periods during which current is not flowing is identified as the "cool" time. Thus, the sequence of welding operations may embody as many as six timing periods each of which is preferably independently adjustable.

Where the timing units each embody an electric timing valve which controls the energization of a relay to secure the desired timing interval, the time required for pick-up and drop-out of the relay may seriously limit the overall speed of operation of the system. If the operation of each of such timing units is made dependent in its turn upon the prior operation of another of the timing units, the consequent cascading of the units causes the pick-up and drop-out times of each of the relays to become cumulative and consequently limit the maximum speed of operation of the system. For certain resistance welding operations, it is desirable to have the timing system operate at speeds up to 360, 3 cycle welds per minute and 400, 2 cycle welds per minute. This is particularly true in the automobile industry where portable gun welders are used.

I have already proposed in my patent, 2,390,981, granted December 18, 1945, for Timing Apparatus, to provide electric timing valves with a plurality of timing circuits so as to reduce the total number of relays employed.

It is an object of my present invention to provide a new and improved timing unit in which one electric timing valve and its anode connected relay provides two independently adjustable alternating timing intervals.

It is a further object of my invention to so combine two or more of these units to provide a repetitive sequence of operations involving a reduced number of operations of the relays with a consequent shortening of the overall operating time for a given sequence of timing operations.

It is a further object of my invention to so combine these timing units that the relay of one of the timing valves controls the timing circuits of another electric valve so that for predetermined periods of time one or the other of the relays are picked up and for other predetermined intervals of time both of the relays are picked up or dropped out.

Figure 2:
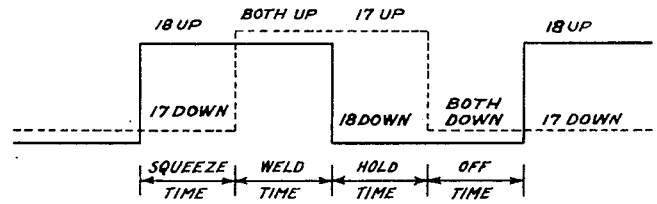
Figure 3:
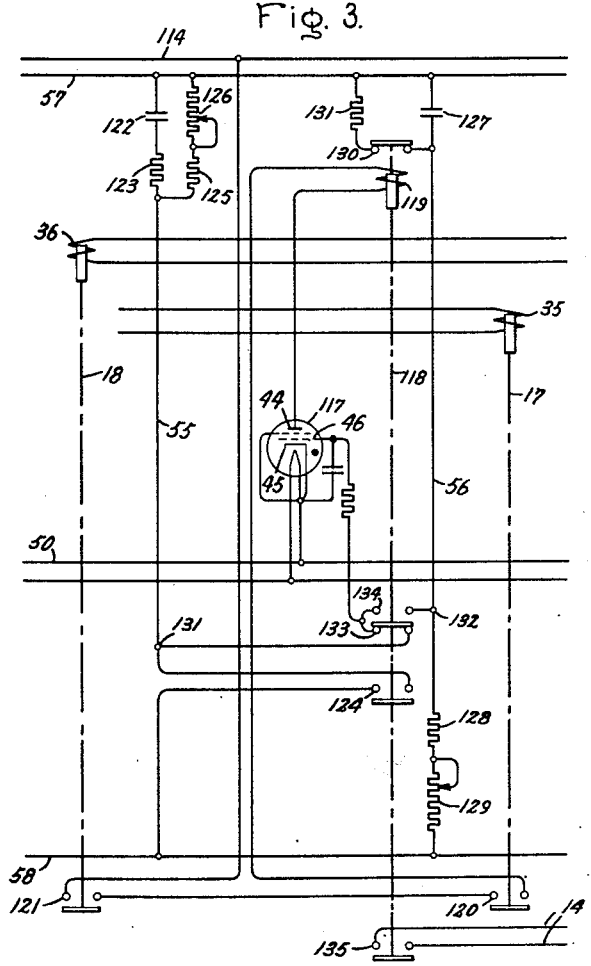

Further objects of my invention will become apparent from a consideration of the embodiments thereof illustrated in Figures 1 and 3 of the drawings. Fig. 1 is a diagrammatic representation of a system embodying two of my timing units for sequencing four timing intervals, each of which is independently adjustable. Fig. 3 is a diagrammatic representation of the connections of a third timing unit which may be interposed in the circuit of Fig. 1 in order to accomplish six independently adjustable timing operations. Fig. 2 of the drawings is a sequence diagram illustrating the operations of the timing units disclosed in Fig. 1.

In accordance with the illustrated embodiments of my invention, timing means responsive respectively to pick-up and drop-out of one relay is employed for delaying respectively the pick-up and drop-out of another relay, and a second timing means responsive respectively to pick-up and drop-out of the other relay is employed for delaying respectively of the drop-out and pick-up of the first mentioned relay, and each of these relays is provided with control contacts connected in control circuits of a translating device in order to sequence certain operations thereof. Thus, as in the illustrated embodiments where the translating apparatus is a resistance welding machine, the electrode pressure sequence may be controlled by making and breaking the control circuit of a solenoid operated air valve and the flow of welding current may be controlled by a pair of parallel reversely connected electric valves having a control circuit, the making and breaking of which controls the flow and interruption of the welding current. In such case, the solenoid valve will be energized during the time that either of the two relays is picked up and the welding current will flow only during the time interval that both relays are picked up simultaneously. The off period of time between welding operations will occur when both of the relays have dropped out.

My new and improved timing unit comprises an electric valve having a pair of timing circuits, each of which includes a capacitor, a charging circuit connecting the capacitor across the direct current source of supply and a discharge circuit connected across the terminals of the capacitor. The electric valve controls the operation of a relay having an operated winding connected in series circuit with the anode-cathode circuit of the electric valve across an alternating current supply source. Operation of the relay actuates switches connected respectively in the charging circuit of one of the capacitors, in the discharging circuit of the other of the capacitors, and between the control element of the electric valve and points in the pair of timing circuits at which transient changes in voltage occur upon the charging and discharging of the capacitors. Thus, a predetermined change in the anode to cathode conductivity of the electric valve operates the switching means to make and break alternately the circuits of the switches to charge and discharge the capacitor in one of the timing circuits while charging and discharging the capacitor in the other of the timing circuits and to connect the control element of the electric valve to be responsive to the charging rate of one of the capacitors and the discharge rate of the other of the capacitors.

By combining two sets of timing units so that the relay of one of the units operates the switches in the pair of timing circuits for the electric valve of the other unit, it is possible to obtain the above described overlapping pick-up and drop-out conditions of the two relays which is responsible for four timing functions with only one pick-up and drop-out operation of each of the relays. This consequently eliminates the time required for two pick-up and two drop-out operations such as would be required if four timing units were operated each in dependence on the other to secure the same four time intervals.

My invention will be better understood from a description of the particular embodiments thereof diagrammatically illustrated in the drawings.

As illustrated in Fig. 1 of the drawings, the load or welding circuit 1 is energized from a source of alternating current 2 through a supply circuit 3 including the primary winding 4 of a welding transformer 5 and a pair of electric valves 6 which are reversely connected in parallel with one another to supply alternating current from the supply circuit through the transformer 5 to its secondary 7 and the load circuit 1 connected thereto. The electric valves 6 may be of any of the types well known in the art but, as illustrated, each comprises an anode 8, a mercury pool cathode 9, and an immersion igniter type control element 10. The igniter elements 10 may be formed of a high resistance material and are arranged in the electric valves so that their tips are immersed in the mercury cathode pools of these valves. The elements of each of these electric valves are enclosed in envelopes which preferably contain, as indicated by the dot, an ionizable medium such as gas or vapor.

The control element 10 of each of the electric valves is connected to its cathode through a bypass rectifier 11 and a blocking rectifier 12 which are connected in series with one another and are poled to pass current from the cathode to the control element. The common connections 13 between each of these pairs of rectifiers 11 and 12 are connected together by a control circuit 14 including normally open series connected pairs of contacts 15 and 16 of relays 17 and 18. When both of these normally open pairs of contacts 15 and 16 are closed, the electric valves 6 become conducting to pass alternating current when the supply circuit 3 is energized. When either or both of these normally open pairs of contacts remain open, the electric valves become non-conducting, even though the supply circuit 3 is energized. Thus, for example, when a positive anode potential is applied to the anode 8 of the left-hand valve 6, current will flow through rectifier 11 for the right-hand valve, through the control circuit 14, and through rectifier 12 for the left-hand valve to its control element and through its cathode to the other supply conductor. In like manner, the right-hand electric valve 6 will become conducting when a positive anode potential is applied to its anode 8, and the control circuit 14 is completed. The rectifiers 11 and 12 are preferably of the contact type, as exemplified by the copper oxide rectifier.

The load circuit 1 is connected to cooperating electrodes 19 and 20 between which the work 21 is inserted for welding. As illustrated, the lower electrode 19 is stationary and constitutes a support for the work 21. The upper electrode 20 is movable into and out of pressure exerting engagement with the work by means of a piston 22 enclosed within a cylinder 23 and biased to its upper position by a spring 24 located within the cylinder and between the piston 22 and the lower end wall of the cylinder. The piston 22 is moved lengthwise of the cylinder 23 against the bias of spring 24 by supplying motive fluid between the piston 22 and the upper end wall of the cylinder 23 through a combined supply and exhaust pipe 25. The supply of fluid, which in most cases will be compressed air, is controlled by a three-way valve 26 having a pressure inlet connection 27 and an exhaust connection 28. The valve 26 is biased to the exhaust position by a spring 29 which is connected to its operating arm 30. This operating arm is also connected with the plunger of a solenoid having an operating winding 31 connected through conductors 32 and the normally open contacts 33 of a relay 34 across the supply conductors 3.

The operating windings 35 and 36 of relay 17 and 18 are respectively connected through electric valves 37 and 38 across the alternating current supply conductors 39 and 40. These conductors 39 and 40 are connected to the secondary 41 of a transformer 42 having its primary 43 connected across the source of alternating current 2.

Electric valves 37 and 38 are each provided with an anode 44, a cathode 45, a control element 46, and a shield grid 47 which is directly connected electrically with its cathode. The elements of each of these electric valves are enclosed in envelopes which preferably contain, as indicated by the dot, an ionizable medium such as a gas or vapor. Capacitors 48 are connected across the control element and cathode of each of the electric valves to render each of these valves resistant to faulty operation resulting from transient anode voltages applied thereto.

Conductor 39 is connected through a normally non-conducting switching means 49 to a conductor 50 which is connected to the cathodes 45 of each of the electric valves 37 and 38. The switching means 49 may be, as illustrated, a push button switch having a pair of normally open contacts 51.

The anode 44 of electric valve 37 is connected in series circuit with the operating windings 35 and a pair of normally open contacts 52 of relay 18 to conductor 40 and the anode 44 of electric valve 38 is connected in series circuit with the operating windings 36 of relay 18 to conductor 40. In each case the operating windings of relays 17 and 18 have connected in parallel therewith a smoothing circuit comprising a resistor 53 connected in series with a capacitor 54. These smoothing circuits render more uniform the energization of the windings of these relays which by reason of the rectifier characteristics of electric valves 37 and 38 are supplied with pulsating current from the alternating current supply conductors 39 and 40.

Each of the electric valves 37 and 38 is provided with a pair of timing circuits one of which, 55, will hereinafter be referred to as the off timing circuit and the other of which, 56, will hereinafter be referred to as the on timing circuit. This designation is employed because the off timing circuits, when connected to the control elements of the electric valves, delay anode-cathode conduction therethrough for positive anode energization thereof and the on timing circuits maintain the electric valves conducting for a predetermined adjustable time with positive anode energization thereof.

These timing circuits are connected across direct current supply conductors 57 and 58 in accordance with the disclosure and claims of Patent 2,422,020, Robert E. Kingsmill, June 10, 1947. They are fed with direct current from a full wave rectifier comprising a double anode discharge device 59 and a mid-tapped secondary winding 60 of transformer 42. The output of this rectifier is filtered by a series resistor 61 and a parallel capacitor 62, and the voltage across conductors 57 and 58 is maintained uniform by a regulating valve 63 which has connected in series therewith across the output terminals of the rectifier, its usual voltage absorbing resistor 64. A voltage divider comprising series connected resistors 65 and 66 has its end terminals connected to conductors 57 and 58 and its mid-terminal connected to conductor 50 which, as previously stated, is connected to the cathodes of the electric valves 37 and 38. The heating filaments for the electric valves 37 and 38 and for the double anode discharge device 59 is supplied by a secondary winding 67 of transformer 42 through circuits the connections of which are obvious.

The off timing circuit for electric valve 37, which determines the squeeze time, comprises a capacitor 68 whose charging circuit is connected across the direct current conductors 57 and 58 through a fixed resistor 69 and the normally closed contacts 70 of relay 18. The discharge circuit for capacitor 68 is completed through a fixed resistor 71 and an adjustable resistor 72 connected across the terminals capacitor 68 through the charging resistor 69. The on timing circuit for electric valve 37, which determines the hold time, comprises a capacitor 73 whose charging circuit is connected across direct current conductors 57 and 58 through a fixed resistor 74 and an adjustable resistor 75. The discharge circuit for capacitor 73 is completed through the normally open contacts 76 of relay 18 and a fixed resistor 77 connected in series with one another across the terminals of capacitor 73.

The off timing circuit 55 for electric valve 38, which determines the off time, comprises a capacitor 78 whose charging circuit is connected across direct current conductors 57 and 58 through a fixed resistor 79, contacts 80 of a selector switch 81 and the normally open contacts 82 of relay 17. The discharge circuit for capacitor 78 is completed through a fixed resistor 83 and an adjustable resistor 84 connected in series with one another and with resistor 79 across its terminals. The on timing circuit 56 for electric valve 38 comprises a capacitor 85 whose charging circuit is connected across direct current conductors 57 and 58 through a fixed resistor 86 and an adjustable resistor 87. The discharge circuit for capacitor 85 is connected across its terminals through the normally closed contacts 88 of relay 17 and a fixed resistor 89.

Depending upon the pick-up and drop-out operation of relays 17 and 18 the control elements 46 of electric valves 37 and 38 are selectively connected to points in the pair of timing circuits of each of these electric valves at which transient changes in voltage occur upon the charging and discharging of the capacitors in these circuits. The control element 46 of electric valve 37 is connected through the usual current limiting resistor 90 and normally open contacts 91 of relay 18 to a point 92 in the off timing circuit 55 of electric valve 37 and through resistor 90 and normally closed contacts 93 of relay 18 to a point 94 in the on timing circuit 56 of electric valve 37. In like manner the control element 46 for electric valve 38 is connected through current limiting resistor 95 and normally closed contacts 96 of relay 17 to a point 97 in the off timing circuit 55 of electric valve 38 and through resistor 95 and normally open contacts 98 of relay 17 to a point 99 in the off timing circuit 56 of electric valve 38.

As will be pointed out subsequently, electric valves 37 and 38 will become conductive alternately and operate relays 17 and 18 alternately once the system thus far described has been set into operation and maintained energized by the closure of push button 49. It is desirable, however, to operate this system for just one sequence of timing operation and for this purpose a non-repeat initiating circuit is provided. This non-repeat initiating circuit is connected to the control element 46 of electric valve 38 through selector switch 81 when this switch is thrown to its left-hand position to complete a circuit through its contact 100. It will be noted that the pairs of contacts 80 and 100 of the selector switch 81 are so related to one another that only one pair of these contacts may be closed at a time. Thus, when the left-hand pair of contacts 100 are closed, the right-hand pair of contacts 80 are open, thereby opening the off time circuit 55 for electric valve 38.

The control element 46 of electric valve 38 is connected through contacts 100 of selector switch 81 and a resistor 101 to the more negative intermediate terminal 102 of a voltage divider comprising series connected resistors 103, 104, 105, whose end terminals are respectively connected to the direct current conductors 57 and 58. The more positive intermediate terminal 106 of this voltage divider is connected through the normally closed contacts 107 of relay 34 and conductor 113 to conductor 50 which is connected to the cathode of electric valve 38. Thus, with switch 81 engaging its contact 100 the more negative intermediate terminal 102 of the voltage divider 103, 104, 105 impresses a voltage on the control element 46 of electric valve 38 which is negative relative to the voltage of its cathode 45.

A positive firing voltage is applied to the control element 46 of electric valve 38 by means of a capacitor 108, one terminal of which is directly connected to the control element 46 of electric valve 38 and through resistor 101 to the more negative intermediate terminal 102 of voltage divider 103, 104, 105. The other terminal of capacitor 108 is connected through a conductor 109 and a resistor 110 to direct current conductor 58 which is also the negative terminal of the voltage divider 103, 104, 105. The common terminal between capacitor 108 and resistor 110 is connected to the alternating current supply conductor 39 and through contacts 51 of push button 49 to conductor 50. This conductor 50, as indicated in the drawing, is preferably connected to ground. A discharge resistor 111 is connected across the terminals of capacitor 108.

The non-repeat excitation circuit above described and its connection in the system of Fig. 1 is not my invention. It forms the subject matter of the application of William B. Hills, Serial No. 48,304, for High-Speed Sequence Control, filed concurrently herewith, assigned to the assignee of this invention and now Patent 2,492,749, granted December 27, 1949.

The operating winding 112 of relay 34 is connected across the alternating current supply conductors 39 and 40 through contacts 51 of push button switch 49, conductors 113 and 114 and the normally open contacts 52 of relay 18. A holding circuit for relay 34 is completed through its normally open contacts 115 which are connected in parallel with the normally open contacts 51 of push button switch 49.

The features and advantages of my system will be better understood from the following description of its operation.

The various elements of the system have been illustrated in their deenergized positions and it is with regard to this deenergized condition that the previously identified pairs of contacts have been referred to as normally open or normally closed.

Operation of the system is initiated by closing the pushbutton switch 49 to complete a circuit through its contacts 51 which connects one of the alternating current supply conductors 39 to conductor 50 and thereby applies alternating current potential across the anode-cathode circuit of electric valve 38. The anode connection of this electric valve is completed through the operating winding 36 of relay 18 to the other alternating current supply conductor 40. With the selector switch 81 in the position illustrated, the control element 46 of electric valve 38 will be at the potential of direct current conductor 57 which is at an upper level relative to the direct current potential of conductor 58 which is connected to the cathode 45 of this electric valve. Consequently, immediately after closure of switch 49, the first positive half wave of anode potential applied to electric valve 38 will cause this electric valve to conduct and the current flow therethrough will cause relay 18 to pick up, closing its normally open contacts 52, 76, 91 and 16 and opening its normally closed contacts 93 and 70.

The closure of contacts 52 of relay 18 connects alternating current supply conductor 40 through the operating winding 35 of relay 17 to the anode 44 of electric valve 37. This valve, however, will not conduct immediately due to the time delay imposed by the off timing circuit 55 of electric valve 37. Prior to pick-up operation of relay 18, capacitor 68 in its off timing circuit was charged by its connection through normally closed contact 70 of relay 18 across direct current conductors 57 and 58. Not until a predetermined time has elapsed after the opening of contact 70 of relay 18 will the charge on capacitor 68 have discharged through its discharging circuit 69, 71 and 72 to a value at which the voltage at point 92 in the off timing circuit 55 becomes more positive than the voltage of the cathode 45 of this electric valve which is connected to direct current conductor 50 having an intermediate voltage level between that of the upper level of conductor 57 and the lower level of conductor 58. After this predetermined time interval has elapsed, which is the squeeze time of the welding sequence, electric valve 37 will become conductive, energizing the operating winding 35 of relay 17, causing this relay to pick up and close its normally open contacts 116, 98, 82 and 15 and open its normally closed contacts 88 and 96. This opens the discharging circuit of capacitor 85 in the on timing circuit 56 of electric valve 38 and connects the control element 46 of electric valve 38 to point 99 in this timing circuit. Electric valve 38, consequently, continues to conduct for the time established by the on timing circuit 56 therefor, until the point 99 therein goes sufficiently negative to render electric valve 38 non-conducting. This period of time is the weld time of the welding sequence.

When electric valve 38 becomes non-conducting, relay 18 drops out, opening its contacts 52, 76, 91 and 16 and closing its contacts 93 and 70. Electric valve 37 does not, however, become immediately non-conducting. It remains conducting until the capacitor 73 has sufficiently charged to lower the voltage at point 94 in its on timing circuit 56 to render it non-conducting. This time interval is the hold time of the welding sequence.

When the electric valve 37 becomes non-conducting, relay 17 drops out, opening its normally open contacts 116, 98, 82 and 15 and closing its normally closed contacts 88 and 96. This opens the charging circuit of the capacitor 78 in the off timing circuit 55 at contacts 82 and transfers the control element connection to point 97 in this timing circuit. After a predetermined time interval, the charge on capacitor 78 decreases sufficiently so that the control element 46 becomes positive relative to its cathode when the electric valve 38 again becomes conducting. This period is the off time of the welding sequence.

By referring to the sequence chart of Fig. 2, it will be noted that, for the squeeze time, relay 18 is picked up, while relay 17 is dropped out; that, for the weld time, both of these relays are picked up; that, for the hold time, relay 17 is picked up, while relay 18 is dropped out; and that, for the off time, both of the relays have dropped out. Thus, for the welding sequence of four time intervals, each relay is picked up but once and dropped out but once, thereby reducing to a minimum the delays imposed in the timing sequence by reason of the pickup and drop-out times of these relays.

Referring again to Fig. 1, it will be noted that, when either or both of the relays 17 and 18 have picked up, the operating winding 112 of relay 34 remains energized by being connected across conductors 39 and 40 through these contacts and the holding contacts 115 of relay 34. Consequently, the solenoid valve 26 will be operated to apply welding pressure through the electrodes 19 and 20 to the work 21 inserted therebetween, due to the closure of normally open contacts 33 in the energizing circuit 32 for the operating winding 31 of the operating solenoid for this valve. When however, both of the relays 17 and 18 have dropped down, relay 34 will be deenergized, opening its contacts 33 and thereby releasing the welding pressure.

It will also be noted that, when both the relays 17 and 18 have picked up, the series connected pairs of contacts 15 and 16 in the ignition circuit 14 for the electric valves 6 is completed, rendering these valves conducting to supply welding current to the electrodes 19 and 20 through the agency of welding transformer 5.

It will also be noted that, once the sequence of operations above described have been initiated, it will continue and be repeated until opening of switch 49 prohibits reinitiation of a following sequence.

It is, of course, desirable to have the system perform in a non-repeat fashion, that is, to have it time but a single sequence of welding operations even though switch 49 be maintained closed. This can be accomplished by throwing the selector switch 81 to its left-hand or non-repeat position which connects the control element 46 of electric valve 38 to its non-repeat excitation circuit. When thus connected, the negative bias of intermediate terminal 102 of voltage divider 103, 104, 105 is connected through resistor 101, contacts 109 of selector switch 81 and normally closed contacts 96 of relay 17 to control element 46 of electric valve 38. Then, upon the closure of push button switch 49, when the anode-cathode circuit of electric valve 38 is connected across the alternating current supply conductors 39 and 40, the lower terminal of capacitor 108 is switched from its connection through resistor 110 to direct current conductor 58 to a connection with the more positive direct current conductor 50. This produces a voltage change at its lower terminal of the capacitor which is in a positive direction and greater in magnitude than the bias voltage applied to the control element 46 of electric valve 38 by its connection with intermediate terminal 102 of the voltage divider 103, 104, 105. This voltage change is reflected on the upper plate of the capacitor 108 which is directly connected to control element 46 of electric valve 38, thereby rendering this electric valve conducting. This change in voltage is absorbed by the buffer resistor 101 which is connected between the control element 46 of electric valve 38 and intermediate terminal 102 of the voltage divider. After a predetermined time interval the change on capacitor 108 leaks off through the discharge resistor 111 connected across its terminals.

Thereafter, the sequence of operation for relays 18 and 17 is as previously described. When relay 18 picks up it energizes the operating winding 112 of relay 34 through its contacts 52 as previously described and relay 34 opens its normally closed contacts 107. This open the tie between intermediate terminal 106 of voltage divider 103, 104, 105 and the direct current conductor 50 of intermediate voltage level. The values of resistors 103, 104, and 105 are such that the voltage of intermediate terminal 102 of the voltage divider thus becomes positive relative to direct current conductor 50, and once conducting, electric valve will remain conducting until the pickup of relay 17 opens its contacts 96. Its conduction will then continue for the weld period determined by the on circuit 56 to which its control element 46 is then connected through contacts 98 of relay 17.

When both of the relays 17 and 18 drop down at the end of the hold time, relay 34 drops down, again completing the connection of intermediate terminal 106 of voltage divider 103, 104, 105 to the direct current conductor 50 of intermediate voltage level, thereby making the intermediate terminal 102 of this voltage divider negative relative to conductor 50 to impress a negative bias voltage on the control element 46 of electric valve 38, biasing this electric valve off and terminating the welding sequence or squeeze, weld, and hold times. Another welding sequence may be initiated by again closing push button switch 49.

As previously noted in the introductory portion of this specification, it is sometimes desirable to perform what is known as pulsation welding which requires the usual welding sequence plus the additional functions of interrupting the welding current flow a predetermined number of times to secure heat and cool times. The control circuit of Fig. 1 above described can be made to perform this sequence for pulsation welding by adding another of my timing units at a location between electric valves 37 and 38. The manner of inserting this additional timing unit in the control circuit of Fig. 1 is made clear by the identification in Fig. 3 of relays 17 and 18 and their operating windings 35 and 36, as well as the identification of conductors 114, 57, 50, and 58.

The timing unit comprises an electric valve 117 and its anode relay 118 whose operating winding 119, in this instance, is connected in series circuit with the anode-cathode circuit of electric valve 117 and normally open contacts 120 of relay 17 and 121 of relay 18 across the alternating current conductors 114 and 50. In Fig. 3, it will be noted that the contacts 15 and 16 of relays 17 and 18 are now performing a different function and have, consequently, been given the reference numerals 120 and 121.

The electric valve 117, like electric valves 37 and 38, has an anode, a cathode and a control element which have been identified by the same reference numerals used for electric valves 37 and 38. Its off timing circuit 55, corresponding to the off timing circuits of electric valves 37 and 38, includes a capacitor 122 whose charging circuit is connected through a fixed resistor 123 and contacts 124 of relay 118 across the direct current conductors 57 and 58 of upper and lower voltage levels. A discharge circuit is provided for this capacitor through resistor 123, a fixed resistor 125, and an adjustable resistor 126. Its on timing circuit 56, corresponding to the on timing circuits 56 for electric valves 37 and 38, comprises a capacitor 127 whose charging circuit is completed through a fixed resistor 128 and an adjustable resistor 129 across the direct current conductors 57 and 58 of upper and lower voltage levels. The discharge circuit for capacitor 127 is completed through the normally closed contacts 130 of relay 118 and a fixed resistor 131.

The control element 46 of electric valve 117 is alternately switched from the point 131 in its off timing circuit 55 to the point 132 in its on timing circuit 56 by the opening and closing of normally closed contacts 133 and normally open contacts 134 of relay 118 upon pickup and dropout of this relay. Each time the relay 118 picks up, it completes the ignition circuit 14 for the electric valves 6 by closing its normally open contacts 135, which, of course, replace contacts 15 and 16 of Fig. 1.

With the addition of the circuit of Fig. 3 in the circuit of Fig. 1, it will be noted that the sequence progresses until the beginning of the weld time when pickup of both relays 17 and 18 causes contacts 120 and 121 thereof to connect electric valve 117 across alternating current conductors 114 and 50, whereupon this electric valve immediately begins conducting to operate relay 118. The pickup of relay 118 closes its contacts 135 to complete the ignition circuit 14 for electric valves 6, causing these valves to conduct for a period of time determined by the on timing period of timing circuit 56. After this on timing period has elapsed, the electric valve 117 becomes non-conducting and remains non-conducting for the period determined by its off timing circuit 55. The electric valve 117 repeats this operation of closing and opening its contacts 135 to initiate and interrupt the flow of welding current for heat and cool periods of time determined by the on and off timing circuits 56 and 55 until drop-out of relay 18 interrupts its operation. Thereafter, the sequence continues as above described in connection with Fig. 1.

It is, of course, apparent that my invention may be variously modified without departing from the spirit and scope of the teachings thereof. Therefore, while I have shown and described but two embodiments of my invention, it will be obvious to those skilled in the art that other embodiments thereof may be made without departing from my invention in its broadest aspects. I, Therefore, aim in the appended claims to cover all such changes and modifications as fall within the true spirit and scope of my invention.

What I claim as new and desire to secure by Letters Patent of the United States is:

1. Timing apparatus comprising two electromagnetic relays each of which has an operating winding and control contacts, supply circuits each of which is completed through an operating winding of a different one of said relays, a different switching means in each of said supply circuits for controlling the energization of said operating windings of said relays, timing means controlling said switching means in circuit with said operating winding of one of said relays and responsive respectively to pick-up and drop-out of said other of said relays for delaying respectively the pick-up and drop-out of said one of said relays, a second timing means controlling said switching means in circuit with said operating winding of said other of said relays and responsive respectively to pick-up and drop-out of said one of said relays for delaying respectively the drop-out and pick-up of said other of said relays, and a control circuit in which contacts of each of said relays are connected.

2. Timing apparatus comprising two electromagnetic relays each of which has an operating winding and control contacts, supply circuits each of which is completed through an operating winding of a different one of said relays, a different switching means in each of said supply circuits for controlling the energization of said operating windings of said relays, timing means controlling said switching means in circuit with said operating of one of said relays and responsive respectively to pick-up and drop-out of said other of said relays for delaying respectively the pick-up and drop-out of said one of said relays, a second timing means controlling said switching means in circuit with said operating winding of said other of said relays and responsive respectively to pick-up and drop-out of said one of said relays for delaying respectively the drop-out and pick-up of said other of said relays, a control circuit completed through said relay contacts connected in parallel with one another, and a second control circuit completed through said relay contacts connected in series with one another.

3. Timing apparatus comprising two electromagnetic relays each of which has an operating winding and control contacts, supply circuits each of which is completed through an operating winding of a different one of said relays, a different switching means in each of said supply circuits for controlling the energization of said operating windings of said relays, timing means controlling said switching means in circuit with said operating winding of one of said relays and responsive respectively to pick-up and drop-out of said other of said relays for delaying respectively the pick-up and drop-out of said one of said relays, a second timing means controlling said switching means in circuit with said operating winding of the other of said relays and responsive respectively to pick-up and drop-out of said one of said relays for delaying respectively the drop-out and pick-up of said other of said relays, translating apparatus for sequencing operations in accordance with the overlapping open and closed circuit condition of two control circuits forming part of said translating apparatus, a parallel connection of contacts of each of said relays in one of said control circuits, and a series connection of contacts of each of said relays in the other of said control circuits.

4. Apparatus comprising supply conductors, a pair of electromagnetic relays each of which has an operating winding and contacts which are opened and closed by pick-up and drop-out of said relay upon a predetermined energization and deenergization of its said operating winding, a pair of switching means each connecting an operating winding of a different one of said relays for energization from said supply conductors, timing means responsive to the closure and opening of contacts of one of said relays upon pick-up and drop-out thereof for operating one of said switching means after a predetermined time delay to energize and deenergize the operating winding of the other of said relays for pick-up and drop-out thereof, a second timing means responsive to the closing and opening of contacts of the other of said relays upon pick-up and drop-out thereof for operating the other of said switching means after a predetermined time delay to deenergize and energize the operating winding of said one of said relays for drop-out and pick-up thereof, a control circuit completed by the closure of the contacts of both of said relays, and a second control circuit completed by the closure of the contacts of either of said relays.

5. Apparatus comprising supply conductors, a pair of electromagnetic relays each of which has an operating winding and contacts which are opened and closed by pick-up and drop-out of said relay upon a predetermined energization and deenergization of its said operating winding, a pair of switching means each connecting the operating winding of a different one of said relays for energization from said supply conductors, timing means responsive to the closure and opening of contacts of one of said relays upon pick-up and drop-out thereof for operating one of said switching means after a predetermined time delay to energize and deenergize said operating winding of the other of said relays for pick-up and drop-out thereof, a second timing means responsive to the closing and opening of contacts of the other of said relays upon pick-up and drop-out thereof for operating the other of said switching means after a predetermined time delay to deenergize and energize said operating winding of said one of said relays for drop-out and pick-up thereof, translating apparatus for sequencing operations in accordance with the overlapping open and closed circuit condition of two control circuits forming part of said translating apparatus, a parallel connection of contacts of each of said relays in one of said control circuits, and a series connection of contacts of each of said relays in the other of said control circuits.

6. Timing apparatus comprising alternating current supply conductors, a pair of electric valves each of which has an anode, a cathode, and a control member, direct current conductors having operating voltages above and below the cathode voltage of said electric valves, connections between the anode and cathode of each of said electric valves and said alternating current supply conductors, a pair of timing circuits for each of said electric valves, each of said timing circuits including a capacitor, a charging circuit connecting said capacitor across said direct current supply conductors and a discharge circuit connected across the terminals of said capacitor, switching means in the charging circuit of one of said capacitors of one of said timing circuits of each of said pairs of timing circuits, in the discharge circuit of the other of said capacitors of the other said timing circuits of each of said pairs of timing circuits and between said control element of each said electric valves and points in the capacitor charging circuits of said pair of timing circuits therefor at which transient changes in voltage occur upon the charging and discharging of said capacitors, and means responsive to a predetermined change in the anode to cathode conductivity of each of said electric valves for operating said switching means in said pair of timing circuits for the other of said electric valves to make and break alternately said charging and discharging circuits thereof and to connect said control element of said other electric valve to be responsive to the charging rate of one of said capacitors and the discharge rate of the other of said capacitors in its said pair of timing circuits.

7. Timing apparatus comprising alternating current supply conductors, a pair of electric valves each of which has an anode, a cathode and a control member, three direct current conductors one of which is connected to the cathodes of said electric valves and the other two of which have operating voltages respectively above and below the voltage of said cathode connected conductor, connections between the anode and cathode of each of said electric valves and said alternating current supply conductors, a pair of timing circuits for each of said electric valves, each of said timing circuits including a capacitor, a charging circuit connecting said capacitor across said other two or said direct current conductors and a discharge circuit connected across the terminals of said capacitor, switching means respectively connected in the charging circuit of one of said capacitors of one of said timing circuits of each of said pairs of timing circuits, in the discharge circuit of the other of said capacitors of the other of said timing circuits of each of said pairs of timing circuits, and between the control element of each of said electric valves and points in the capacitor charging circuits of its said pair of timing circuits at which occur upon the charging and discharging of said capacitors transient changes in voltage, and means responsive to a predetermined change in the anode to cathode conductivity of each of said electric valves for operating said switching means in said pair of timing circuits for the other of said electric valves to make and break alternately said charging and discharging circuits of said capacitors thereof and to connect said control element of said other electric valve to be responsive alternately to the charging rate of one of said capacitors and the discharge rate of the other of said capacitors.

8. Timing apparatus comprising two electromagnetic relays each having pairs of contacts and means including an operating winding for actuating said contacts, a source of direct current voltage including means for establishing points of extreme and intermediate voltage, two electric valves each of which has an anode, a cathode and a control member, connections between the cathodes of said electric valves and said point of intermediate direct current voltage, a pair of timing circuits for each of said electric valves, each of said timing circuits including a capacitor, a charging circuit connecting said capacitor across said extreme points of direct current voltage and a discharge circuit connected across the terminals of said capacitor, and each of said pairs of timing circuits including pairs of contacts operated by a different one of said relays, one pair of said contacts being connected in the charging circuit of one of said capacitors, another pair of said contacts being connected in the discharge circuit of the other of said capacitors and third and fourth pairs of said contacts being connected between the control element of each of said electric valves and points in the capacitor charging circuits of its said pair of timing circuits at which occur, upon the charging and discharging of said capacitors, transient changes of voltage which, when applied to the control element of said electric valve, delay changes in its anode to cathode conductivity, alternating current supply conductors, and connections across said alternating current supply conductors each of said connections being completed through the anode to cathode circuit of one of said electric valves and the operating winding of that of one of said relays whose pairs of contacts are connected in said pair of timing circuits for the other of said electric valves.

9. Timing apparatus comprising two electromagnetic relays each having pairs of contacts and means including an operating winding for actuating said contacts, a source of direct current voltage including means for establishing points of extreme and intermediate voltage, two electric valves each of which has an anode, a cathode and a control member, connections between the cathodes of said electric valves and said point of intermediate direct current voltage, a pair of timing circuits for each of said electric valves, each of said timing circuits including a capacitor, a charging circuit connecting said capacitor across said extreme points of direct current voltage and a discharge circuit connected across the terminals of said capacitor, and each of said pairs of timing circuits including contacts operated by a different one of said relays, one pair of said contacts being connected in the charging circuit of one of said capacitors, another pair of said contacts being connected in the discharge circuit of the other of said capacitors, and third and fourth pairs of said contacts being connected between the control element of each of said electric valves and points in the capacitor charging circuits of its said pair of timing circuits at which occur, upon the charging and discharging of said capacitors, transient changes of voltage which, when applied to the control element of said electric valve, delay changes in its anode to cathode conductivity, alternating current supply conductors, means controlling the connection of one of said alternating current supply conductors with said point of intermediate direct current voltage, and circuits each of which connects the anode of one of said electric valves to the other of said alternating current supply conductors in series with the operating winding of that one of said relays whose pairs of contacts are connected in said pair of timing circuits for the other of said electric valves.

10. Timing apparatus comprising two electromagnetic relays each having pairs of contacts and means including an operating winding for actuating its said pairs of contacts, two electric valves each of which has an anode, a cathode and a control member, first and second direct current conductors having operating voltages above and below the operating voltage of a third direct current conductor which is connected to the cathodes of said electric valves, a pair of timing circuits for each of said electric valves, each of said timing circuits including a capacitor, a charging circuit connecting said capacitor across said first and second direct current conductors and a discharge circuit connected across the terminals of said capacitor, and each of said pairs of timing circuits including pairs of contacts operated by a different one of said relays, one pair of said contacts being connected in the charging circuit of one of said capacitors, another pair of said contacts being connected in the discharge circuit of the other of said capacitors and third and fourth pairs of said contacts being connected between the control element of each of said electric valves and points in the capacitor charging circuits of its said pair of timing circuits at which occur, upon the charging and discharging of said capacitors thereof, transient changes of voltage which, when applied to the control element of said electric valve, delay change in its anode to cathode conductivity, and supply circuits each of which is completed through the anode to cathode circuit of one of said electric valves and the operating winding of that one of said relays whose pairs of contacts are connected in said pair of timing circuits of the other of said electric valves.

11. Timing apparatus comprising two electromagnetic relays each having pairs of contacts and means including an operating winding for actuating its said pairs of contacts, two electric valves each of which has an anode, a cathode and a control member, first and second direct current conductors having operating voltages above and below the operating voltage of a third direct current conductor which is connected to the cathodes of said electric valves, a pair of timing circuits for each of said electric valves, each of said timing circuits including a capacitor, a charging circuit connecting said capacitor across said first and second direct current conductors and a discharge circuit connected across the terminals of said capacitor, and each of said pairs of timing circuits including pairs of contacts operated by a different one of said relays, one pair of said contacts being connected in the charging circuit of one of said capacitors, another pair of said contacts being connected in the discharge circuit of the other of said capacitors and third and fourth pairs of said contacts being connected between the control element of each of said electric valves and points in the capacitor charging circuits of its said pair of timing circuits at which occur, upon the charging and discharging of said capacitors thereof, transient changes of voltage which, when applied to the control element of said electric valve, delay change in its anode to cathode conductivity, supply circuits each of which is completed through the anode to cathode circuit of one of said electric valves and the operating winding of that one of said relays whose pairs of contacts are connected in said pair of timing circuits of the other of said electric valves, and a control circuit in which contacts of each of said relays are connected.

12. Timing apparatus comprising two electromagnetic relays each having pairs of contacts and means including an operating winding for actuating its said pairs of contacts, two electric valves each of which has an anode, a cathode and a control member, first and second direct current conductors having operating voltages above and below the operating voltage of a third direct current conductor which is connected to the cathodes of said electric valves, a pair of timing circuits for each of said electric valves, each of said timing circuits including a capacitor, a charging circuit connecting said capacitor across said first and second direct current conductors and a discharge circuit connected across the terminals of said capacitor, and each of said pairs of timing circuits including pairs of contacts operated by a different one of said relays, one pair of said contacts being connected in the charging circuit of one of said capacitors, another pair of said contacts being connected in the discharge circuit of the other of said capacitors and third and fourth pairs of said contacts being connected between the control element of each of said electric valves and points in the capacitor charging circuits of its said pair of timing circuits at which occur, upon the charging and discharging of said capacitors thereof, transient changes of voltage which, when applied to the control element of said electric valve, delay change in its anode to cathode conductivity, supply circuits each of which is completed through the anode to cathode circuit of one of said electric valves and the operating winding of that one of said relays whose pairs of contacts are connected in said pair of timing circuits of the other of said electric valves, a control circuit including one of said pairs of control contacts of each of said relays connected in parallel with one another, and a second control circuit including one of said pairs of control contacts of each of said relays connected in series with one another.

13. Timing apparatus comprising alternating current supply conductors, conductors supplying upper, lower and intermediate levels of direct current voltage, first and second electric valves each having an anode, a cathode and a control element and each having its cathode connected to said direct current conductor of intermediate voltage, means controlling the connection of one of said alternating current supply conductors with the cathodes of said electric valves, first and second electromagnetic relays each having pairs of contacts and means including a winding for operating said pairs of contacts, said winding of said first relay being connected in series relation with the anode to cathode circuit of said first electric valve to the other of said alternating current supply conductors and said winding of said second relay being connected in series relation with the anode to cathode circuit of said second electric valve and a normally open pair of contacts of said first relay to the other of said alternating current supply conductors, off and on grid control timing circuits for each of said electric valves, each of said off timing circuits having a capacitor, a discharge circuit permanently connected across said capacitor and a charging circuit for said capacitor connected for said first electric valve across said direct current conductors of upper and lower voltage levels through a normally open pair of contacts of said second relay and for said second electric valve through a normally closed pair of contacts of said first relay, each of said on timing circuits having a capacitor, a charging circuit for said capacitor permanently connected across said direct current conductors of upper and lower voltage levels and a discharge circuit connected for said first electric valve across said capacitor through a normally closed pair of contacts of said second relay and for said second electric valve through a normally open pair of contacts of said first relay, and the control element of said first electric valve being connected to its said off timing circuit through a normally closed pair of contacts of said second relay and to its said on timing circuit through a normally open pair of contacts of said second relay and the control element of said second electric valve being connected to its said off timing circuit through a normally open pair of contacts of said first relay and to its said on timing circuit through a pair of normally closed contacts of said first relay, said control element connections in each case being to points in the capacitor charging circuits of said timing circuits at which occur upon charging and discharging of said capacitors transient changes of voltage which with anode energization of said electric valve delay the attainment of pick-up and drop-out values of current flow through said relay winding and the anode to cathode circuit of said electric valve connected in series therewith, a control circuit having connected therein parallel connected, normally open pairs of said contacts of said first and second relays and a second control circuit having connected therein series connected normally open pairs of contacts of said first and second relays.

14. Timing apparatus comprising alternating current supply conductors, conductors supplying upper, lower and intermediate levels of direct current voltage, first and second electric valves each having an anode, a cathode and a control element and each having its cathode connected to said direct current conductor of intermediate voltage, means controlling the connection of one of said alternating current supply conductors with the cathodes of said electric valves, first and second electromagnetic relays each having pairs of contacts and means including a winding for operating said pairs of contacts, said winding of said first relay being connected in series relation with the anode to cathode circuit of said first electric valve to the other of said alternating current supply conductors and said winding of said second relay being connected in series relation with the anode to cathode circuit of said second electric valve and a normally open pair of contacts of said first relay to the other of said alternating current supply conductors, off and on grid control timing circuits for each of said electric valves, each of said off timing circuits having a capacitor, a discharge circuit permanently connected across said capacitor and a charging circuit for said capacitor connected for said first electric valve across said direct current conductors of upper and lower voltage levels through a normally open pair of contacts of said second relay and for said second electric valve through a normally closed pair of contacts of said first relay, each of said on timing circuits having a capacitor, a charging circuit for said capacitor permanently connected across said direct current conductors of upper and lower voltage levels and a discharge circuit connected for said first electric valve across said capacitor through a normally closed pair of contacts of said second relay and for said second electric valve through a normally open pair of contacts of said first relay, and the control element of said first electric valve being connected to its said off timing circuit through a normally closed pair of contacts of said second relay and to its said on timing circuit through a normally open pair of contacts of said second relay and the control element of said second electric valve being connected to its said off timing circuit through a normally open pair of contacts of said first relay and to its said on timing circuit through a pair of normally closed contacts of said first relay, said control element connections in each case being to points in the capacitor charging circuits of said timing circuits at which occur upon charging and discharging of said capacitors transient changes of voltage which with anode energization of said electric valve delay the attainment of pick-up and drop-out values of current flow through said relay winding and the anode to cathode circuit of said electric valve connected in series therewith, and translating apparatus for sequencing a plurality of operations one of which is dependent on the opening and closing of one control circuit forming part of said translating apparatus and the other of which is dependent on the opening and closing of a second control circuit forming part of said translating apparatus, said one of said control circuits having connected therein parallel connected, normally open pairs of said contacts of said first and second relays and said other of said control circuits having connected therein series connected normally open pairs of contacts of said first and second relays.

15. Timing apparatus comprising alternating current supply conductors, conductors supplying upper, lower and intermediate levels of direct current voltage, first, second and third electric valves each having an anode, a cathode and a control element and each having its cathode connected to said direct current conductor of intermediate voltage, means controlling the connection of one of said alternating current supply conductors with the cathodes of said electric valves, first, second and third electromagnetic relays each having pairs of contacts and means including a winding for operating said pairs of contacts, said winding of said first relay being connected in series relation with the anode to cathode circuit of said first electric valve to the other of said alternating current supply conductors, said winding of said second relay being connected in series relation with the anode to cathode circuit of said second electric valve and a pair of contacts of said first relay to the other of said alternating current supply conductors, and said winding of said third relay being connected in series relation with the anode to cathode circuit of said third electric valve and series connected pairs of contacts of said first and second relays to the other of said alternating current supply conductors, a pair of timing circuits for each of said electric valves, each of said timing circuits including a capacitor, a charging circuit for said capacitor connected across said direct current conductors of upper and lower voltage levels and a discharge circuit connected across the terminals of said capacitor, and said pair of timing circuits for said first electric valve including pairs of contacts operated by said second relay, said pair of timing circuits for said second electric valve including pairs of contacts operated by said first relay and said pair of timing circuits for said third relay including pairs of contacts operated by said third relay, one pair of said relay contacts for each pair of timing circuits being connected in the charging circuit of one of said capacitors, another pair thereof being connected in the discharge circuit of the other of said capacitors and second and third pairs thereof being connected between the control element of said electric valve having said timing circuits and points in the capacitor charging circuits of each of said pair of timing circuits at which occur upon charge and discharge of said capacitors transient changes of voltage effective in controlling the anode to cathode conductivity of said electric valve, a control circuit having connected therein parallel connected pairs of said contacts of said first and second relays, and a second control circuit having connected therein a pair of contacts of said third relay.

16. Timing apparatus comprising alternating current supply conductors, conductors supplying upper, lower and intermediate levels of direct current voltage, first, second and third electric valves each having an anode, a cathode and a control element and each having its cathode connected to said direct current conductor of intermediate voltage, means controlling the connection of one of said alternating current supply conductors with the cathodes of said electric valves, first, second and third electromagnetic relays each having pairs of contacts and means including a winding for operating said pairs of contacts, said winding of said first relay being connected in series relation with the anode to cathode circuit of said first electric valve to the other of said supply conductors, said winding of said second relay being connected in series relation with the anode to cathode circuit of said second electric valve and a normally open pair of contacts of said first relay to the other of said alternating current supply conductors, and said winding of said third relay being connected in series relation with the anode to cathode circuit of said third electric valve and series connected, normally open pairs of contacts of said first and second relays to the other of said alternating current supply conductors, off and on grid control timing circuits for each of said electric valves, each of said off timing circuits having a capacitor, a discharge circuit permanently connected across said capacitor and a charging circuit for said capacitor respectively connected for said first, second and third electric valves across said direct current conductors of upper and lower voltage levels through a normally open pair of contacts of said second relay, a normally closed pair of contacts of said first relay and a normally open pair of contacts of said third relay, each of said on timing circuits having a capacitor, a charging circuit for said capacitor permanently connected across said direct current conductors of upper and lower voltage levels and a discharge circuit respectively connected for said first, second and third electric valves across said capacitor through a normally closed pair of contacts of said second relay, a normally open pair of contacts of said first relay and a normally closed pair of contacts of said third relay, and the control element of said first, second and third electric valves being respectively connected to its said off timing circuit through a normally closed pair of contacts of said second relay, a normally open pair of contacts of said first relay and a normally closed pair of contacts of said third relay and to its said on timing circuit through a normally open pair of contacts of said second relay, a normally closed pair of contacts of said first relay and a normally open pair of contacts of said third relay to points in the capacitor charging circuits of said timing circuits at which occur upon charging and discharging of said capacitors transient changes of voltage which with anode energization of said electric valve delay the attainment of pick-up and drop-out values of current flow through said relay winding and the anode to cathode circuit of said electric valve connected in series therewith, a control circuit having connected therein parallel connected, normally open pairs of said contacts of said first and second relays, and a second control circuit having connected therein a normally open pair of contacts of said third relay.

17. Timing apparatus comprising alternating current supply conductors, conductors supplying upper, lower and intermediate levels of direct current voltage, first, second and third electric valves each having an anode, a cathode and a control element and each having its cathode connected to said direct current conductor of intermediate voltage, means controlling the connection of one of said alternating current supply conductors with the cathodes of said electric valves, first, second and third electromagnetic relays each having pairs of contacts and means including a winding for operating said pairs of contacts, said winding of said first relay being connected in series relation with the anode to cathode circuit of said first electric valve to the other of said supply conductors, said winding of said second relay being connected in series relation with the anode to cathode circuit of said second electric valve and a normally open pair of contacts of said first relay to the other of said alternating current supply conductors, and said winding of said third relay being connected in series relation with the anode to cathode circuit of said third electric valve and series connected, normally open pairs of contacts of said first and second relays to the other of said alternating current supply conductors, off and on grid control timing circuits for each of said electric valves, each of said off timing circuits having a capacitor, a discharge circuit permanently connected across said capacitor and a charging circuit for said capacitor respectively connected for said first, second and third electric valves across said direct current conductors of upper and lower voltage levels through a normally open pair of contacts of said second relay, a normally closed pair of contacts of said first relay and a normally open pair of contacts of said third relay, each of said on timing circuits having a capacitor, a charging circuit for said capacitor permanently connected across said direct current conductors of upper and lower voltage levels and a discharge circuit respectively connected for said first, second and third electric valves across said capacitor through a normally closed pair of contacts of said second relay, a normally open pair of contacts of said first relay and a normally closed pair of contacts of said third relay, and the control element of said first, second and third electric valves being respectively connected to its said off timing circuit through a normally closed pair of contacts of said second relay, a normally open pair of contacts of said first relay and a normally closed pair of contacts of said third relay and to its said on timing circuit through a normally open pair of contacts of said second relay, a normally closed pair of contacts of said first relay and a normally open pair of contacts of said third relay to points in the capacitor charging circuits of said timing circuits at which occur upon charging and discharging of said capacitors transient changes of voltage which with anode energization of said electric valve delay the attainment of pick-up and drop-out values of current flow through said relay winding and the anode to cathode circuit of said electric valve connected in series therewith, and translating apparatus for sequencing a plurality of operations one of which is dependent on the opening and closing of one control circuit forming part of said translating apparatus and the other of which is dependent on the opening and closing of a second control circuit forming part of said translating apparatus, said one of said control circuits having connected therein parallel connected, normally open pairs of said contacts of said first and second relays and said other of said control circuits having connected therein a normally open pair of contacts of said third relay.

18. Timing apparatus comprising an electric valve having an anode, a cathode and a control member, alternating current supply conductors respectively connected to the anode and cathode of said electric valve, direct current conductors having operating voltages above and below the cathode voltage of said electric valve, a pair of timing circuits for said electric valve each of which includes a capacitor, a charging circuit connecting said capacitor across said direct current supply conductors and a discharge circuit connected across the terminals of said capacitor, switching means respectively in the charging circuit of one of said capacitors, in the discharge circuit of the other of said capacitors and between said control element of said electric valve and points in the capacitor charging circuits of said timing circuits at which transient changes in voltage occur upon the charging and discharging of said capacitors, and means responsive to a predetermined change in the anode to cathode conductivity of said electric valve for operating said switching means to make and break alternately the circuits therethrough to charge and discharge said capacitor in one of said timing circuits while charging and discharging said capacitor in the other of said timing circuits and to connect said control element of said electric valve to be responsive to the charging rate of one of said capacitors and the discharge rate of the other of said capacitors.

19. Timing apparatus comprising alternating current supply conductors, an electric valve having an anode, a cathode and a control member, alternating current supply conductors respectively connected to the anode and cathode of said electric valve, direct current conductors for supplying upper, lower, and intermediate voltage valves, a connection between the cathode of said electric valve and said direct current conductor of intermediate voltage valve, a pair of timing circuits for said electric valve each of which includes a capacitor, a charging circuit connecting said capacitor across said direct current conductors of upper and lower voltage valves and a discharge circuit connected across the terminals of said capacitor, switching means respectively in the charging circuit of one of said capacitors, in the discharge circuit of the other of said capacitors and between said control element of said electric valve and points in the capacitor charging circuits of said timing circuits at which transient changes in voltage occur upon the charging and discharging of said capacitors, and means responsive to a predetermined change in the anode to cathode conductivity of said electric valve for operating said switching means to make and break alternately the circuits therethrough to charge and discharge said capacitor in one of said timing circuits while charging and discharging said capacitor in the other of said timing circuits and to connect said control element of said electric valve to be responsive to the charging rate of one of said capacitors and the discharge rate of the other of said capacitors.

20. Timing apparatus comprising alternating current supply conductors, direct current conductors for supplying upper, lower, and intermediate values of voltage, an electric valve having an anode, a cathode and a control element and having its cathode connected to said direct current conductor of intermediate voltage, a connection between the anode of said electric valve and one of said alternating current supply conductors, means controlling the connection of the other of said alternating current supply conductors with said direct current conductor of intermediate voltage, means for controlling the anode to cathode conductivity of said electric valve, said means including two timing circuits each of which has a capacitor, a charging circuit therefor connected across said direct current conductors of upper and lower voltages and a discharging circuit therefor connected across its terminals, and means responsive to predetermined changes in the anode to cathode conductivity of said electric valve for making and breaking alternately the charging circuit for one of said capacitors and the discharge circuit of the other of said capacitors to produce transient changes in voltage at points in the capacitor charging circuits of said timing circuits and for transferring the connection of the control element of said electric valve with said points from that timing circuit which has altered in one direction the conductivity of said electric valve to the other of said timing circuits which after a time delay reversely alters the conductivity of said electric valve.

21. Timing apparatus comprising an electric valve having an anode, a cathode and a control member, alternating current supply conductors respectively connected to the anode and cathode of said electric valve, direct current conductors for supplying upper, lower, and intermediate values of voltage, a connection between the cathode of said electric valve and said direct current conductor of intermediate voltage, a pair of timing circuits for said electric valve each of which includes a capacitor, a charging circuit therefor connected across said direct current conductors of upper and lower voltages and a discharging circuit therefor connected across its terminals, a switch in the capacitor discharge circuit of one of said timing circuits, a switch in the capacitor charging circuit of the other of said timing circuits, a pair of switches each of which is respectively connected between said control element of said electric valve and a corresponding terminal of a different one of said capacitors at which terminals a transient voltage change occurs as a result of operation of said switches in said timing circuits, and means responsive to a predetermined change in the anode to cathode conductivity of said electric valve for opening said switch in one of said timing circuits, closing said switch in the other of said timing circuits and operating said pair of switches to transfer the control element connection of said electric valve from said other of said timing circuits to said one of said timing circuits.

22. Timing apparatus comprising alternating current supply conductors, direct current conductors for supplying upper, lower and intermediate values of voltage, an electric valve having an anode, a cathode and a control element, a connection between the anode of said electric valve and one of said alternating current supply conductors, a connection between the cathode of said electric valve and said direct current conductor of intermediate voltage, means controlling the connection of the other of said alternating current supply conductors with said direct current conductor of intermediate voltage, a timing circuit including a capacitor, a discharge circuit permanently connected across the terminals of said capacitor, a charging circuit connecting said capacitor across said direct current conductors of upper and lower voltage values, and a switch in said charging circuit, a second timing circuit including a second capacitor, a discharge circuit connected across the terminals of said second capacitor, a switch in said discharge circuit, and a charging circuit permanently connecting the terminals of said second capacitor across said direct current conductors of upper and lower voltage values, a pair of switches each of which is respectively connected between said control element of said electric valve and a corresponding terminal of a different one of said capacitors at which terminals a transient voltage change occurs as a result of operation of said switches in said timing circuits, and means responsive to a predetermined change in the anode to cathode conductivity of said electric valve for opening said switch in one of said timing circuits, closing said switch in the other of said timing circuits and operating said pair of switches to transfer the control element connection of said electric valve from said other of said timing circuits to said one of said timing circuits.

23. Timing apparatus comprising an electric valve having an anode, a cathode and a control member, alternating current supply conductors respectively connected to the anode and cathode of said electric valve, direct current conductors for supplying upper, lower, and intermediate values of voltage, a connection between the cathode of said electric valve and said direct current conductor of intermediate voltage, a pair of timing circuits for said electric valve each of which includes a capacitor and charging and discharging circuits therefor, a first switch in the capacitor discharging circuit of one of said timing circuits, a second switch in the capacitor charging circuit of the other of said timing circuits, a third switch in a circuit between the control element of said electric valve and a point in the capacitor charging circuit of said one of said timing circuits at which a transient change of voltage occurs as a result of the operation of said first switch, a fourth switch in a circuit between the control element of said electric valve and a point in the capacitor charging circuit of said other of said timing circuits at which a transient change of voltage occurs as a result of the operation of said second switch, and means responsive to a predetermined change in the anode to cathode conductivity of said electric valve for alternately operating said switches to complete the circuits through said second and said third switches when the circuit through said first and said fourth switches are opened and to complete the circuits through said first and fourth switches at the time the circuits through said second and third switches are opened.

24. Timing apparatus comprising alternating current supply conductors, direct current conductors supplying upper, lower and intermediate levels of voltage, an electric valve having an anode, a cathode and a control element and having its cathode connected with said direct current conductor of intermediate voltage, means controlling the connection of one of said alternating current supply conductors with the cathode of said electric valve, an electromagnetic relay having pairs of contacts and means including a winding for operating said pairs of contacts, said winding of said relay being connected in series relation with the anode to cathode circuit of said electric valve to the other of said supply conductors, a timing circuit for said electric valve including a capacitor, a discharging circuit permanently connected across said capacitor and a charging circuit for said capacitor connected across said direct current conductors of upper and lower voltage levels through a normally open pair of contacts of said relay, a second timing circuit for said electric valve including a capacitor, a charging circuit for said capacitor permanently connected across said direct current conductors of upper and lower voltage levels and a discharge circuit connected across said capacitor through a normally closed pair of contacts of said relay, connections between the control element of said electric valve and said first mentioned timing circuit through a normally closed pair of contacts of said relay and between the control element of said electric valve and said second of said timing circuits through a normally open pair of contacts of said relay to points in the capacitor charging circuits of said timing circuits at which occur upon charging and discharging of said capacitors transient changes of voltage which with anode energization of said electric valve delays the attainment of pick-up and drop-out values of current flow through said relay winding and the anode to cathode circuit of said electric valve connected in series therewith, and a control circuit having connected therein a pair of contacts of said relay.

25. Timing apparatus comprising alternating current supply conductors, direct current conductors for supplying upper, lower, and intermediate values of voltage, an electric valve having an anode, a cathode and a control element and having its cathode connected to said direct current conductor of intermediate voltage, an electromagnetic relay having an operating winding one terminal of which is connected to one of said alternating current supply conductors and the other terminal of which is connected to the anode of said electric valve, means controlling the connection of the other of said alternating current supply conductors with said direct current conductor of intermediate voltage, means for controlling the anode to cathode conductivity of said electric valve and consequently the operation of said relay, said means including two timing circuits, each of which has a capacitor, a charging circuit connected across said direct current conductors of upper and lower voltage and a discharging circuit connected across its terminals, means responsive to each operation of said relay resulting in pick-up or drop-out thereof for making and breaking alternately the charging circuit for one of said capacitors and the discharge circuit of the other of said capacitors to produce transient changes in voltage at points in the capacitor charging circuits of said timing circuits and for transferring the connection of the control element of said electric valve with said points in said timing circuits from that timing circuit which has produced operation of said relay by altering in one direction the conductivity of said electric valve to the other timing circuit which after a time delay reversely alters the conductivity of said electric valve and again operates said relay.

MAURICE E. BIVENS.

REFERENCES CITED

The following references are of record in the file of this patent:

UNITED STATES PATENTS

| Number | Name | Date |
| --- | --- | --- |
| 2,264,067 | Chambers | Nov. 25, 1941 |
| 2,348,862 | Sorkin | May 16, 1944 |
| 2,370,727 | Holden | Mar. 6, 1945 |
| 2,404,773 | Brown | July 30, 1946 |
| 2,422,020 | Kingsmill | June 10, 1947 |
| 2,471,834 | McDowell | May 31, 1949 |
| 2,484,575 | Livingston | Oct. 11, 1949 |